United States Patent [19]

Kemp et al.

[11] Patent Number: 4,759,554
[45] Date of Patent: Jul. 26, 1988

[54] MECHANICAL FACE SEALS

[75] Inventors: John Kemp, Earnhan Common; David J. Lowe, Maidenhead, both of United Kingdom

[73] Assignee: Crane Packing Limited, Slough, England

[21] Appl. No.: 924,454

[22] Filed: Oct. 29, 1986

[30] Foreign Application Priority Data

Nov. 1, 1985 [GB] United Kingdom ............... 8527022
Jul. 5, 1986 [GB] United Kingdom ............... 8616458

[51] Int. Cl.⁴ .................... F16J 15/34; F16J 15/38
[52] U.S. Cl. .................................. 277/65; 277/71; 277/74; 277/83; 277/87; 277/93 SD; 277/96.2; 277/137
[58] Field of Search ............... 277/82, 83, 84, 93 R, 277/93 SD, 74, 75, 76, 117, 122, 119, 120, 121, 137, 136, 96.2, 81.8, 65, 85, 86, 87, 71, 190

[56] References Cited

U.S. PATENT DOCUMENTS

| | | | |
|---|---|---|---|
| 493,978 | 3/1893 | Churchill | 277/122 X |
| 677,931 | 7/1901 | Bader | 277/122 X |
| 839,900 | 1/1907 | Sparrow | 277/136 |
| 952,769 | 3/1910 | Switzer | 277/120 |
| 1,329,829 | 2/1920 | Drum | 277/122 |
| 2,321,927 | 6/1943 | McCoy et al. | 277/75 X |
| 2,879,094 | 3/1959 | Transeau | 277/120 |
| 2,928,685 | 3/1960 | Tracy | 277/93 X |
| 3,025,070 | 3/1962 | Copes | 277/81 S |
| 3,117,794 | 1/1964 | Wachal | 277/92 |
| 3,420,535 | 1/1969 | Hershey | 277/92 |
| 3,472,522 | 10/1969 | Winfrey | 277/136 X |
| 3,858,890 | 1/1975 | Wiese | 277/93 R |
| 3,972,536 | 8/1976 | Warner et al. | 277/83 |
| 4,007,940 | 2/1977 | Chapa | 277/93 R |
| 4,142,731 | 3/1979 | Filippov et al. | 277/96.1 |
| 4,212,474 | 7/1980 | Arai | 277/84 X |
| 4,248,488 | 2/1981 | Sable | 277/136 X |
| 4,410,186 | 10/1983 | Pierce, Jr. | 277/75 X |
| 4,434,986 | 3/1984 | Warner . | |
| 4,489,916 | 12/1984 | Stevens | 277/121 X |

FOREIGN PATENT DOCUMENTS

| | | | |
|---|---|---|---|
| 63676 | 11/1982 | European Pat. Off. . | |
| 930494 | 1/1948 | France . | |
| 57100 | 10/1952 | France . | |
| 320297 | 10/1929 | United Kingdom | 277/83 |
| 2056585 | 3/1981 | United Kingdom . | |
| 2056584 | 3/1981 | United Kingdom . | |
| 750130 | 7/1980 | U.S.S.R. | 277/83 |

Primary Examiner—Allan N. Shoap
Attorney, Agent, or Firm—Solon B. Kemon

[57] ABSTRACT

A mechanical face seal comprises a first seal face member associated in fixed relationship and sealed with respect to one component, a second seal face member associated in fixed rotational relationship and sealed with respect to a second component and a third seal face member interposed between the first and second seal face members. Springs are provided to urge the second seal face member towards the first seal face member and maintain the first, second and third seal face members in sealing engagement. The sealing faces of the first, second and third seal face members are inclined, so that the first and second seal face members impose a radial load on the third seal face member. Two such seal assemblies may be provided co-axially of one another to provide a double seal.

11 Claims, 2 Drawing Sheets

MECHANICAL FACE SEALS

BACKGROUND TO THE INVENTION

The present invention relates to mechanical face seals.

SUMMARY OF THE INVENTION

According to one aspect of the present invention a mechanical face seal for providing a fluid tight seal between a pair of relatively rotatable components comprises; a first annular seal face member mounted in fixed rotational relationship and sealed with respect to one of said components, said first seal face member defining an inclined annular sealing face; a second annular seal face member mounted in fixed rotational relationship and sealed with respect to said other component, said second seal face member being moveable axially with respect to the two components and defining an inclined annular sealing face which is opposed to the sealing face of the first seal face member; a third annular seal face member disposed between and free to rotate relative to the first and second seal face members; and spring means associated with the second seal face member to urge it axially towards the first seal face member, so as to maintain opposed sealing faces of the third seal face member in sealing engagement with sealing faces of the first and second seal face members respectively.

The inclined sealing faces of the first and second seal face members will thus exert a radial force on the third seal face member, which will centralise the third seal face member and provide radial stability. Preferably the inclined sealing faces of the first and second seal face members will be oppositely inclined and exert an inward radial load on the third seal face member.

Two such mechanical face seal assemblies may be mounted coaxially of one another to provide a double seal. Preferably in a double seal of such configuration the sealing faces of the first seal face members are oppositely inclined, the sealing faces of the second seal face members are oppositely inclined and each pair of sealing faces of the axially opposed first and second seal face members are oppositely inclined.

The inner and outer first seal face members may be defined by a single annular component. However, each pair of second seal face members and each pair of third seal face members are preferably defined by separate annular components. Separate spring means may be provided to urge each of the second seal face members towards the opposed sealing faces of the first seal face members.

With the double seal assembly disclosed above, a chamber is defined between the pair of the third seal face members, one or more passages passing between the concentric sealing faces of the first or second seal face members may be provided to this chamber, so that fluid leaking past the sealing faces may be drained from the chamber, or fluid may be introduced into the chamber to provide a barrier and for lubricating and/or cooling purposes.

BRIEF DESCRIPTION OF THE DRAWINGS

Several embodiments of the invention are now described, by way of example only, with reference to the accompanying drawings, in which.

DESCRIPTION OF A PREFERRED EMBODIMENT

Figure 1:
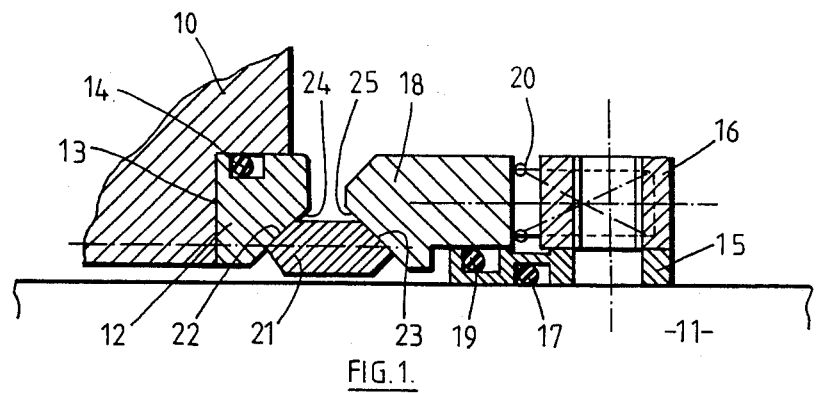
FIG. 1 shows in part section, a mechanical face seal formed in accordance with the present invention.

FIG. 1 illustrates a mechanical face seal which provides a seal between a housing 10 and a rotatable shaft 11 at the point where the shaft 11 penetrates the housing 10. A first annular seal face member, or seat 12, is located within a recess 13 in the housing 10, around the periphery of the bore through which the shaft 11 passes. The seat 12 is sealed to the housing 10 by means of an elastomeric O-ring 14 or other conventional methods.

A sleeve member 15 is mounted upon the shaft 11 adjacent to but spaced axially from the housing 10 and is clamped thereto by clamping ring 16 carrying a plurality of radially disposed clamping screws (not shown). The sleeve 15 is sealed to the shaft 11 by means of elastomeric O-ring 17. A second annular seal face member 18 is slidingly located on the sleeve 15 and is sealed thereto by means of elastomeric O-ring 19. A plurality of axially extending circumferentially spaced compression springs 20 acting between the clamping ring 16 and the seal face member 18 urge the seal face member 18 towards the seat 12. A pin, or similar driving device, not shown, engages in opposed bores in the second seal face member 18 and clamping ring 16 to locate the second seal face member 18 rotationally with respect to shaft 11.

The seat 12 and second seal face member 18 are provided with opposed mutually inclined frustroconical sealing faces 24, 25. A third annular seal face member 21 is positioned between the sealing faces 24, 25 and has corresponding sealing faces 22, 23 which engage the sealing faces 24, 25 respectively and are maintained in sealing engagement therewith by means of the axial force exerted by springs 20. The frustroconical surfaces 24, 25 also exert an inwardly radial force on the third seal face member 21, to centre it with respect to said surfaces.

In the seal arrangement described above, the third seal face member 21 floats between the seat 12 and second seal face member 18 and is not constrained rotationally with respect to either the shaft 11 or housing 10. Under normal sealing conditions the third seal face member 21 will tend to rotate with the second seal face member 18, due to the small amount of drag that will exist between faces 23 and 25. However, if for some reason, for example temporary dry running, friction between one pair of faces 22 and 24 or 23 and 25 became exceptionally high, then relative movement betwen that pair of faces would stop and the relative movement would occur at the other pair of faces, thus avoiding the excessive wear that would otherwise occur at the high friction surfaces.

In the seal described above, the third seal face member 21 may constitute the wear element and would be made of a softer material than the seat 12 and the second seal face member 18. For example, the third seal face member 21 could be made from graphite, carbon or plastics material and the seat 12 and second seal face member 18 from metal or a sintered refractory material, for example alumina. The seal face member 21 may however be made of similar or harder material than the seat 12 and second seal face member 18. Moreover, replaceable wearing faces may be provided on the seat 12 to define sealing face 24 and/or on member 18 to define sealing face 25.

In order to facilitate removal and replacement of the third seal face member 21 when worn, this member may conveniently be split axially into a plurality of arcuate portions. Member 21 could then be removed and replaced merely by retracting the second seal face member 18. The various arcuate portions forming the third seal face member 21 will be held together when the seal is assembled by the inward radial forces applied by the conical faces 24, 25 of the seat 12 and second seal face member 18.

The seat 12 and second seal face member 18 may also be split axially to facilitate removal and replacement. With such constructions, the portions of seat 12 will be held together by the surrounding housing 10; alternatively these portions may be bolted together using tangential bolts. The portions of the second seal face member 18 may be bolted together using tangential bolts or a suitable clamping ring.

Figure 2:
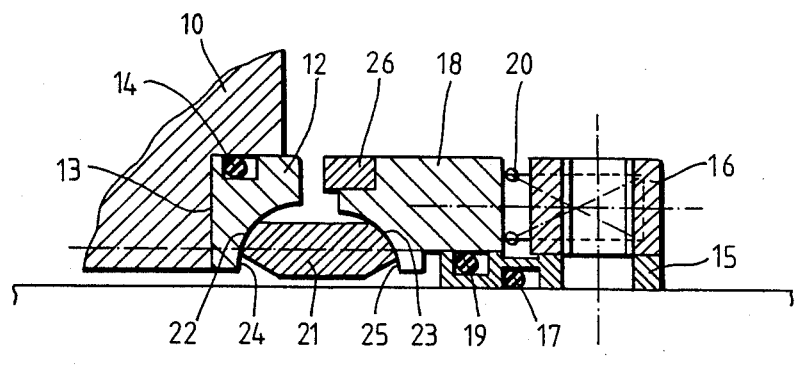
FIG. 2 shows in part section, a modified version of the seal shown in FIG. 1.

Provided the sealing faces 22, 23, 24 and 25 are machined to a reasonable finish, lapping of the faces is not necessary and a running in period could provide a fluid tight seal between the faces. This arrangement will also accommodate variations in eccentrics introduced, for example, by shaft radial or seal housing misalignments. However, where it may be necessary to accommodate large misalignments and/or sealing is required from start up, the faces 22, 23, 24 and 25 may be made semispherical as illustrated in FIG. 2. With this arrangement the axial alignment of the third seal face member 21 with respect to the seat 12 and second seal face member 18 may vary considerably, while still maintaining full sealing engagement.

Also as illustrated in FIG. 2, an emergency sealing face 26 may be provided on the second seal face member 18, so that when wear of the third seal face member 21 reaches a certain limit or the third seal face member 21 collapses, for example as a result of accidental damage, the emergency sealing face 26 will engage the seat 12 to provide an emergency seal.

Figure 3:
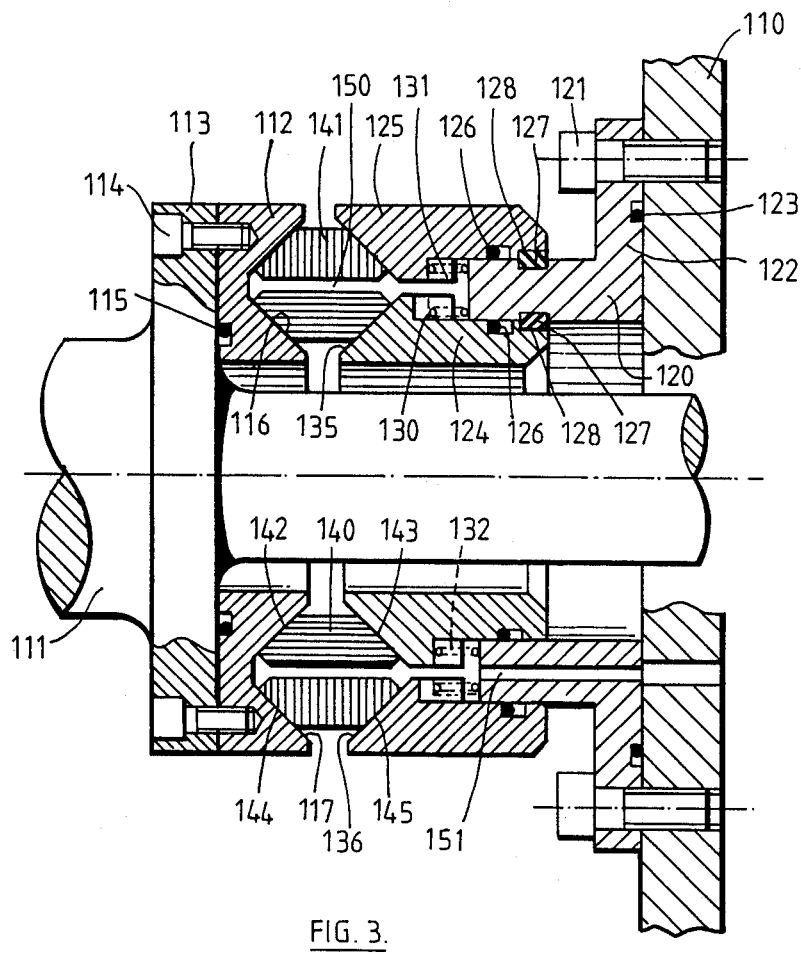
FIG. 3 shows in sectional elevation a double seal formed in accordance with the present invention.

In the double seal illustrated in FIG. 3, a first annular seal face assembly or seat 112, is bolted to a radially extending flange 113 on the shaft 111, by means of a plurality of angularly spaced bolts 114. The seat 112 is sealed to the flange 113 by means of an elastomeric O-ring 115 or by other conventional methods. The seat 112 defines a pair of oppositely inclined frustroconical sealing faces 116 and 117.

A tubular support member 120 is bolted to the housing 110 by means of a plurality of angularly spaced bolts 121 passing through a flange portion 122, so that the tubular portion of support member 120 extends coaxially of the shaft 111 towards the seat 112. The flange portion 122 of support member 120 is sealed with respect to the housing 110, by means of an elastomeric O-ring 123. A pair of coaxial sealing rings 124 and 125 are slidingly mounted on the internal and external surfaces respectively, of the tubular portion of support member 120. The rings 124 and 125 are sealed with respect to the support member 120 by means of elastomeric O-rings 126. Keys 127 mounted on the support member 120 engage in axially extending key-ways 128 in the sealing rings 124 and 125, so as to permit axial but prevent rotational movement of the rings 124 and 125 relative to the support member 120.

A plurality of angularly spaced axially extending grooves 130 and 131 of part circular cross section, are provided in the outer surface of ring 124 and the inner surface of ring 125, so that when aligned, the grooves 130 and 131 will provide locations for a plurality of helical compression springs 132. The grooves 130 and 131 open to the surface of the rings 124 and 125 that engage the support member 120 and are closed at their other end, so that the springs 132 may act between the end of support member 120 and the closed end of the grooves 130 and 131, to urge the rings 124 and 125 axially towards the seat 112. Alternate grooves 130 in ring 124 and alternate grooves 131 in ring 125 are of increased length relative to the intermediate grooves, and the shorter grooves 130 on ring 124 are aligned with the longer grooves 131 on ring 125, so that adjacent springs 132 will act between the support member 120 and either the end of groove 130 in ring 124 or the end of groove 131 in ring 125. In this manner, rings 124 and 125 will be independently loaded towards the seat 112. Oppositely inclined frustroconical sealing faces 135 and 136 are provided on the ends of rings 124 and 125 respectively, sealing face 135 being axially aligned and of opposite inclination to the sealing face 16 on seat 112, and sealing face 136 being axially aligned and of opposite inclination to sealing face 117 on seat 112.

A pair of third seal face members 140 and 141 are positioned between the sealing faces of seat 112 and rings 124 and 125, seal face member 140 having a pair of frustroconical sealing faces 142 and 143 corresponding to and engaging sealing face 116 of seat 112 and sealing face 135 of ring 124, respectively. Similarly the seal face member 141 has a pair of frustroconical sealing faces 144 and 145 corresponding to and engaging sealing face 117 of seat 112 and sealing face 136 of ring 125, respectively. The sealing faces 116 and 142, 143 and 135, 117 and 144, and 145 and 136 are maintained in sealing engagement by means of the axial force exerted by springs 132. The frustroconical surfaces 116 and 135, and 117 and 136 also exert radial loads on the seal face members 140 and 141 respectively to centre these with respect to said frustroconical surfaces.

As with the embodiments described with reference to FIGS. 1 and 2, in the seal arrangement described above, the third seal face members 140 and 141 float between the seat 112 and rings 124 and 125 of the second seal face assembly and are not constrained rotationally with respect to either the shaft 111 or housing 110, thus avoiding the excessive wear when one pair of faces is subjected to high friction running conditions.

An annular chamber 150 is defined between the seal face members 140 and 141. One or more passages 151 may be provided through the tubular portion of support member 120 and through the housing 110, to communicate with this chamber 150. Where, for example, the seal is to be used to separate one service on the outside of ring 125 and member 141 from another service on the inside of ring 124 and member 140, the passage 151 may serve to remove any fluid which leaks past sealing faces 116 and 142, 143 and 135, 117 and 144 or 145 and 136, so that the fluid in one service will not be contaminated by the fluid in the other service, even if some leakage does occur across the sealing faces. Alternatively, if for example the seal is to be used to seal a potentially hazardous gas or vapour from atmosphere, the chamber 150 may be filled with a barrier liquid, which will also serve to lubricate and cool the sealing faces.

As described with reference to FIGS. 1 and 2 the materials used to produce the members 112, 124, 125, 140 and 141 may be selected for their wear properties or may be provided with wear inserts. The various annular members may be of split configuration to facilitate removal and replacement and the sealing faces may be of semi-spherical rather than frustro-conical configuration.

Various modifications may be made, without departing from the present invention. For example the seat 12; 112 may be mounted with respect to the housing 10 and the members 18; 124 and 125 mounted with respect to the shaft 11; 111. Moreover the members 12; 112 may also be moveable axially with respect to the components.

Furthermore, in the double seal, the sealing faces 116 and 117 of the seat 112 may be formed on separate rings. While in the embodiment illustrated in FIG. 3, rings 124 and 125 are of similar configuration, the configuration of these rings may be varied to adjust their pressure balance and hence the effect of the pressure of fluid on the inner and outer seals, so that differential loading of the inner and outer seal face members may be achieved or to compensate for pressure differentials across the seal. Also the spring rates of the springs 132 acting on the rings 124 and 125 may differ to vary the axial loads applied to the inner and outer seal face members 140 and 141.

We claim:

1. A mechanical face seal for producing a fluid tight seal between a pair of relatively rotatable components comprising:
   an annular first seal face assembly mounted in fixed rotational relationship and sealed with respect to one of said components, said first seal face assembly defining a pair of radially spaced sealing faces, said sealing faces being inclined to the axis of the first seal face assembly;
   a pair of annular second seal face members, each second seal face member being mounted in fixed rotational relationship and sealed with respect to the other of said components, said second seal face members being movable axially of the two components, each second seal face member being axially opposed to one of the sealing faces of the first seal face assembly and defining a sealing face at the end adjacent thereto, said sealing faces being oppositely inclined to the axially opposed sealing faces of the first seal face assembly; independent spring means acting upon each of the second seal face members to urge them axially towards the axially opposed sealing faces of the first seal face assembly;
   and a pair of third seal face members, each third seal face member being interposed between and making sealing engagement with one of the sealing faces of the first seal face assembly and the sealing face of the axially opposed second seal face member.

2. A mechanical face seal according to claim 1 in which the first seal face assembly comprises a ring having a pair of inclined concentric annular sealing faces.

3. A mechanical face seal according to claim 1 in which the second seal face members are slidingly mounted and sealed with respect to the internal and external diameters of a tubular support member, which is mounted on said other component, said second seal face members being keyed to the tubular support member to prevent rotation relative thereto.

4. A mechanical face seal according to claim 1 in which a plurality of angularly spaced axially extending grooves are provided in the outer surface of the inner second seal face member and the inner surface of the outer second seal face member, so that when aligned, the grooves will provide locations for a plurality of angularly spaced compression springs which will act between the end of the tubular support member and the closed end of the axially extending grooves, to urge the second seal face members towards the first seal face assembly.

5. A mechanical face seal according to claim 4 in which alternate axially extending grooves in the outer second seal face member and alternate axially extending grooves in the inner second seal face member are of increased length relative to the intermediate grooves, the shorter grooves on the outer second seal face member being aligned with the longer grooves on the inner second seal face member so that adjacent springs will act between the support member and the end of the shorter groove in the outer second seal face member or the shorter groove in the inner second seal face member.

6. A mechanical face seal according to claim 4 in which the spring rate of the spring means acting upon the inner and outer second seal face members differ.

7. A mechanical face seal according to claim 1 in which the dimensions of the second seal face members differ, so that the pressure balance thereon will differ.

8. A mechanical face seal according to claim 1 in which an annular chamber is defined between the third seal face members, a passage being provided to said annular chamber between one pair of the sealing faces defined by the first seal face assembly and the second seal face members, by means of which fluid may be removed from or introduced into the annular chamber.

9. A mechanical face seal according to claim 1 in which the third seal face member is made of material which is softer than the materials used to define the sealing faces of the first and second seal face members.

10. A mechanical face seal according to claim 9 in which the third seal face member is made from a material selected from the group consisting of graphite, carbon and a plastics material and the first and second seal face members are made from a material selected from the group consisting of metal and sintered refractory material.

11. A mechanical face seal according to claim 1 in which the sealing faces of the first seal face assembly are oppositely inclined.

* * * * *